Patented June 19, 1951

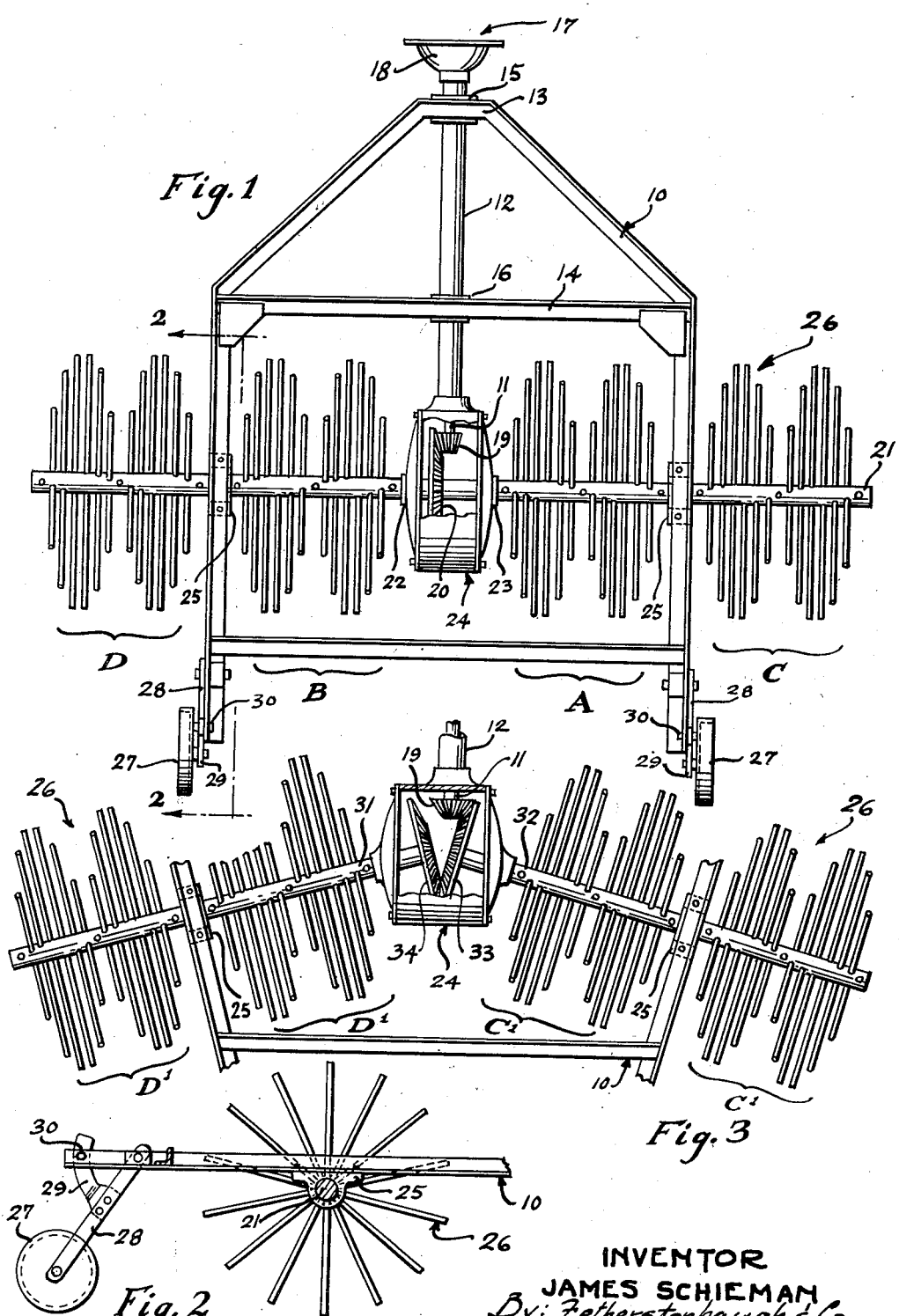

2,557,475

UNITED STATES PATENT OFFICE 2,557,475

SUGAR BEET GATHERER

James Schieman, Glencoe, Ontario, Canada

Application May 28, 1947, Serial No. 750,959

2 Claims. (Cl. 56—27)

This invention relates to a sugar beet gatherer which can be pulled and driven by conventional tractors and the like.

It is the usual practice in the harvesting of sugar beets for workers to remove them and heap them in rows about three feet apart. The rows of sugar beets must then be gathered, the total operations of harvesting, therefore, requiring the hiring of a large number of persons. It is a purpose of the present invention to reduce the number of personnel required in these operations and to reduce the amount of time absorbed in gathering the beets during harvesting operations.

It is the prime object of the present invention to provide a sugar beet gatherer which may be drawn by a conventional tractor and driven by the power take-off.

Another object of the invention is to provide a sugar beet gatherer as before which employs a pair of horizontal shafts mounting spirally disposed rods which flail in a direction opposed to the direction of movement of the gatherer to urge beets to either side of the device into a pair of parallel spaced apart rows.

With these and other objects in view, the present invention generally comprises a frame mounting a drive connectable to the power take-off of a tractor or other suitable device. A plurality of rods mounted in spaced apart relation and disposed in a spiralling manner upon shaft means and driven by the drive shaft are designed to urge beets on the ground surface over which the frame travels when drawn by the tractor to either side of the frame, the frame being adjustably supported by suitable wheels to determine the relation of engagement of the rods with the beets.

Other objects of the invention will be apparent from a study of the following specification taken in conjunction with the accompanying drawings.

In the drawings—

Figure 1 is a plan view of a sugar beet gatherer according to my invention with the housing for the flailing rod shaft drive means broken away to show construction.

Figure 2 is view 2—2 of Figure 1.

Figure 3 is a plan view with the housing for the flailing rod shaft drive means broken away to show construction of the preferred form indicating an obtuse angular disposition of the rod mounting shafts relative to the drive shaft.

Referring now to the drawings and particularly to Figure 1, a suitable frame 10 mounts a drive shaft 11 in the bearing sleeve 12, the latter being welded to the members 13 and 14 of the frame as at 15 and 16. The free end 17 of the shaft 11 is designed to be connected to a conventional power take-off (not shown) of a tractor or other suitably drawn device, the connection housing 18 serving as a draw connection to the tractor and being designed to effect this function in the desired manner. It will be appreciated, however, that many alternatives will be evident to skilled persons in the specific means of connecting the present device to a tractor or other suitable drawing or driving vehicle.

The drive shaft 11 carries the pinion 19 which mates with the crown gear 20, the latter being fixed to the transverse shaft 21 mounted by suitable bearings 22 and 23 in the housing enclosure 24 and to the frame 10 in the bearing mounts 25.

The through shaft 21 shown in Figure 1 mounts a plurality of spaced apart flailing rods 26 axially thereof which are disposed radially as indicated in Figure 2 on a spirally shaped line that winds around the shaft 21 as indicated in Figure 1 to provide a spiralled structure. As indicated in Figure 2, the shaft 21 is intended to rotate in a counter-clockwise direction which is in a direction opposed to the direction of movement of the complete assembly, that is the frame 10 carrying the operative elements described. Upon close inspection of Figure 1, it will be apparent from an observation of the points of connection of the free ends of the rods 26 with the through shaft 21 that the spiral pitches formed will cause movement of beets engaged by the ends of rods 26 toward the centre to form a row beneath the centre line of the frame by the group of rods indicated by A and B. The groups C and D, however, cause the beets to be urged outwardly of the frame to form parallel rows at the outer extremities of the path of movement of the complete structure. The present device, therefore, as it is drawn over the ground, will urge the beets into three rows such that they may more easily be picked up.

In order to determine the degree of engagement of the ends of the rod 26 with the beets and the ground surface, the supporting wheels 27 extending downwardly from the adjustable arms 28 at the rear of the frame 10 have suitable adjusting means in the form of a segment 29 and a locking nut 30.

If the device of Figure 1 were operated at a fairly high rate of travel over the ground surface, the beets might be damaged by the flailing action of the rods 26 urging them forward at the same speed as well as pushing them to form the rows described. Thus, for a predetermined workable rate of speed the common shaft 21 is separated into a pair of shaft 31 and 32 raked backwardly by mounting means as indicated in Figure 3. In this form the drive shaft 11 and its pinion 19 engages a crown gear 33, the latter mating with and driving the crown gear 34, the gear 33 connecting to shaft 32 and gear 34 being mounted on shaft 31. The groups of rods 26 operate in the manner formerly described with the exception that the pitch of the spiral is continuous, that is, there are a pair of groups C1 on one side and a pair of groups D1 on the other side such that the beets will be urged outwardly and to either side of the ends of shafts 31 and 32 to effectively form two rows. The result is that in the alternative form the present device is capable of operation at much greater ground speeds since nearly all the force utilized serves to urge the beets sideways rather than forward. It is appreciated, of course, that some of the beets will be missed in this gathering operation but due to the increased speed, overall efficiency is not detracted from and the beets are damaged less.

It will be apparent to skilled persons that many alternatives and modifications may be effected in the spiral means employed, the specific structure of the frame and drive connection. It is, therefore, intended that the present disclosure should not be limited in any way other than that indicated by the scope of the following claims.

What I claim as my invention is:

1. In a gatherer having a frame adapted to be impelled along the ground, and a source of rotational power carried by said frame, two shafts, means for rotatably mounting said shafts in said frame transversely thereof in substantially parallel spaced apart relation to the ground, said shafts each having a back rake, spiral conveyor means carried by each of said shafts, a transmission adapted to connect said rotatably mounted shafts to said source of power in said frame whereby to cause them to rotate in a direction opposed to the movement of said frame over the ground, said spiral means being pitched to urge small pieces lying on the ground in a direction substantially transversely of the path of said frame into at least one row.

2. In a gatherer having a frame adapted to be impelled along the ground, and a source of rotational power carried by said frame, two shafts, means for rotatably mounting said shafts in said frame transversely thereof in substantially parallel spaced apart relation to the ground, said shafts each having a back rake, spiral conveyor means formed by a plurality of rods extending radially from said shafts at spaced apart intervals along their lengths, said rods having their ends arranged in spiral lines, a transmission adapted to connect said rotatably mounted shafts to said source of power in said frame whereby to cause them to rotate in a direction opposed to the movement of said frame over the ground, said spiral means being pitched to urge small pieces lying on the ground in a direction substantially transversely of the path of said frame into at least one row.

JAMES SCHIEMAN.

REFERENCES CITED

The following references are of record in the file of this patent:

UNITED STATES PATENTS

| Number | Name | Date |
| --- | --- | --- |
| 393,115 | Little | Nov. 20, 1888 |
| 939,765 | Walte | Nov. 9, 1909 |
| 1,034,957 | Bering et al. | Aug. 6, 1912 |
| 1,296,227 | Strand | Mar. 4, 1919 |
| 1,628,971 | Halliday | May 17, 1927 |
| 1,911,535 | Schultze | May 30, 1933 |
| 2,255,288 | Jones et al. | Sept. 9, 1941 |
| 2,320,642 | Neidhart | June 1, 1943 |
| 2,341,486 | Swertfeger | Feb. 8, 1944 |

FOREIGN PATENTS

| Number | Country | Date |
| --- | --- | --- |
| 68,100 | Austria | Mar. 10, 1915 |